United States Patent [19]

Howard

[11] Patent Number: 4,863,225
[45] Date of Patent: Sep. 5, 1989

[54] REFLECTION HOLOGRAMS FORMED BY SCANNING

[75] Inventor: Richard K. Howard, Chatham, England

[73] Assignee: GEC Avionics Limited, England

[21] Appl. No.: 27,885

[22] Filed: Mar. 19, 1987

[30] Foreign Application Priority Data

Mar. 26, 1986 [GB] United Kingdom ............... 8607585

[51] Int. Cl.$^4$ .............................................. G03H 1/04
[52] U.S. Cl. ...................................... 350/3.65; 350/3.7; 350/3.71
[58] Field of Search .................... 350/3.65, 3.7, 6.9, 350/3.71

[56] References Cited

U.S. PATENT DOCUMENTS

| 3,698,010 | 10/1972 | Lee ........................... 350/3.65 |
| 3,706,080 | 12/1972 | Lee ........................... 350/3.65 |
| 3,720,453 | 3/1973 | Lee et al. .................. 350/3.65 |
| 3,883,216 | 5/1975 | Lee ........................... 350/3.65 |
| 4,128,297 | 12/1978 | Bourne ........................ 350/6.9 |
| 4,293,864 | 10/1981 | Scott .......................... 350/6.9 |
| 4,395,088 | 7/1983 | Firth et al. ................. 350/3.7 |

FOREIGN PATENT DOCUMENTS 2159979 12/1985 United Kingdom .

Primary Examiner—Bruce Y. Arnold
Assistant Examiner—Martin Lerner
Attorney, Agent, or Firm—Kirschstein, Ottinger, Israel & Schiffmiller

[57] ABSTRACT

A method of producing a reflection hologram wherein light from a source (29) is directed onto the hologram recording medium (23) via a lens (21) which causes light reaching the medium (23) to pass through a construction point (33). The light beam is arranged where it is incident on the lens (21) to be of small cross-sectional area compared with the lens aperture and is arranged to scan over the lens aperture so that the beam scans the medium (23) in a regular pattern of overlapping narrow bands. In this way the hologram may be made to have uniform spectral properties despite a non-uniform energy distribution in the beam.

14 Claims, 3 Drawing Sheets

REFLECTION HOLOGRAMS FORMED BY SCANNING

BACKGROUND OF THE INVENTION

1. Field of the Invention

This invention relates to methods and apparatus for making reflection holograms, and to holograms made thereby.

2. Description of Related Art

During the last few years many optical systems have made use of holographic optical elements to save space, weight or accomplish optical effects impossible by conventional methods. One particular group of holographs used as wavelength selective mirrors are known as reflection holograms. These holograms consist of a recording of a set of interference planes creating, within a suitable recording medium, modulations in refractive index or aborption. These modulations act to reflect only light for which the optical path difference between the planes is a multiple of the wavelength of the incident light. This means, since the path difference is angularly dependent, that the wavelength of the reflected light is also dependent on angle and obeys the Bragg condition:

$$\frac{\lambda}{\cos \theta} = \text{constant}$$

where
 $\lambda$ = Wavelength of light reflected
 $\theta$ = Internal angle of incidence of reflected light to hologram planes One application of such a hologram is as a laser eye protection filter. In such an application the hologram is required to have the property of reflecting light of the relevant wavelength or wavelengths directed towards the position at which the eye will be located in use.

One known method of making such a hologram will now be described with reference to FIG. 1 which is a diagram illustrating the method.

Referring to FIG. 1, in this method a coherent light beam 1, e.g. from a laser, is formed into a cone of light 3 by a lens 5. The apex 7 of the cone 3 constitutes the so-called construction point of the hologram, corresponding to the position at which the eye will be located in use of the hologram. The hologram is formed in a film 9 of light sensitive material onto which the cone of light 3 is directed. The film 9 is positioned at a distance from the apex 7 corresponding to the desired position of the hologram with respect to the eye in use, the film 9 typically being of spherical form with its concave side towards the construction point 7 as shown in FIG. 1. The film is supported on a substrate 11 of transparent material, e.g. glass, disposed on the same side of the film as the lens 5. Normally a spatial filter 13 is positioned at the apex 7 to prevent skew rays reaching the film 9. The hologram is produced in the film 9 by interference between light directly transmitted through the film 9, and light reflected back through the film 9 after transmission therethrough at the surface of a mirror 15 on the side of the film 9 remote from the source of the light beam. Instead of a mirror surface, Fresnel reflection within the film 9 at the surface of the film 9 remote from the source of the light beam may be used, Fresnel reflection being the reflection of a small fraction of light occurring whenever light is incident on the boundary of a transparent medium. After exposure the film is processed in known manner to fix an image of the interference pattern in the film, as described for example in U.S. Pat. No. 4395088 filed in the names of Kenneth Firth and Richard Keith Howard on the 11th Mar., 1981, which is hereby incorporated by reference.

The above described method of producing a reflection hologram suffers from the difficulty that the energy profile of the light beam needs to be made as uniform as possible, in order that the hologram produced may have uniform spectral properties, and that suitable light sources, e.g. lasers, typically give a beam of gaussian energy profile.

SUMMARY OF THE INVENTION

It is an object of the present invention to provide a method and apparatus for making a reflection hologram wherein this difficulty is overcome.

According to the present invention in a method of producing a reflection hologram wherein light from a source is formed into a beam directed onto a film of light sensitive material via a lens which serves to cause light reaching the film to pass along paths extending through a construction point, the light beam is arranged where it is incident on the lens to be of small cross-sectional area compared with the aperture of the lens and is arranged to scan over the aperture of the lens so that the beam scans the film in a regular pattern of overlapping narrow bands.

The invention also provides apparatus for carrying out a method according to the invention.

BRIEF DESCRIPTION OF THE DRAWINGS

Two methods and apparatus in accordance with the invention will now be described by way of example with reference to the accompanying drawings in which.

DETAILED DESCRIPTION OF THE PREFERRED EMBODIMENTS

Figure 1:
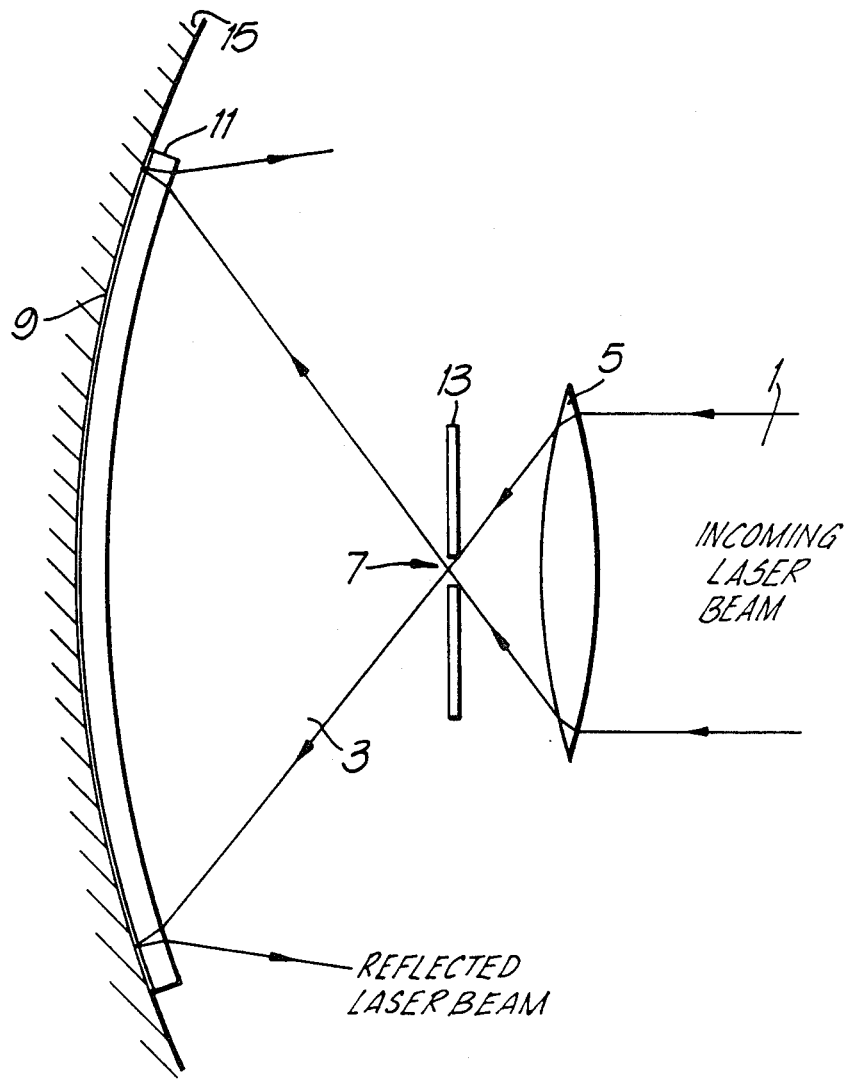
FIG. 1 is a diagram illustrating the invention.
Figure 2:
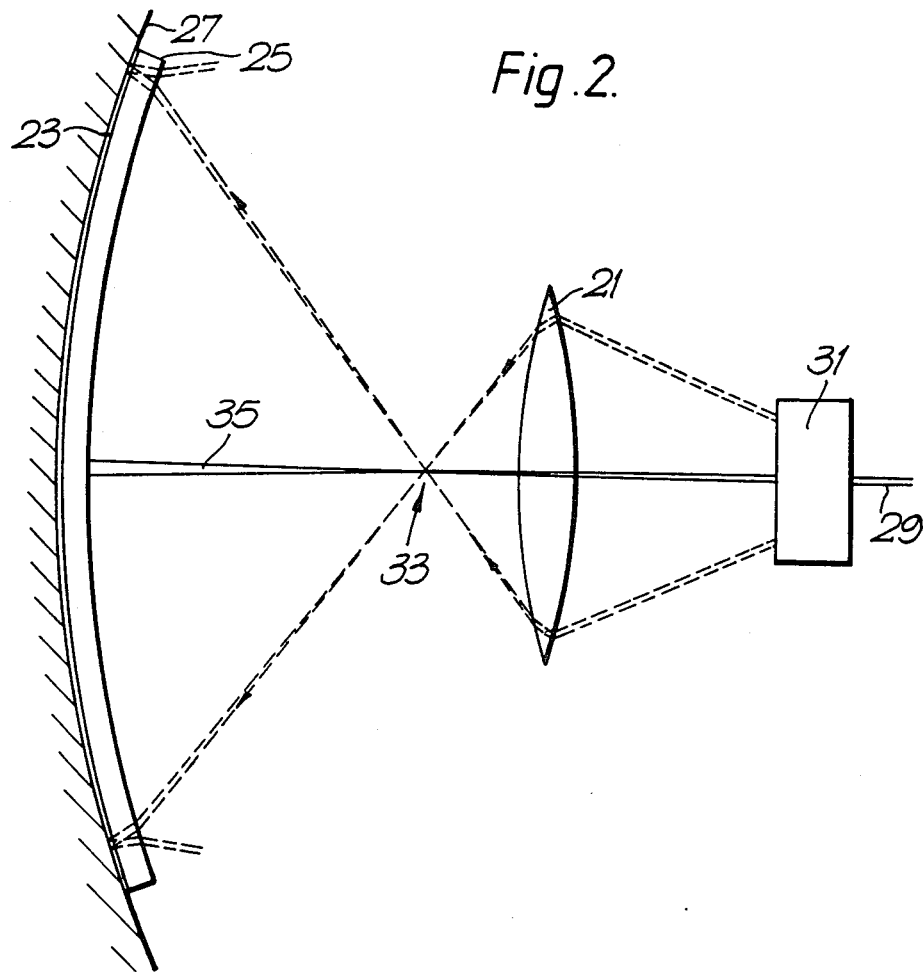
FIG. 2 is a diagram of a first apparatus.

Referring to FIG. 2, the first apparatus comprises a lens 21, a film 23 of light sensitive material carried on a glass substrate 25, and a mirror 27 arranged as described above in relation to FIG. 1.

A small area laser beam 29, e.g. of diameter 2 millimeters, is directed at the lens 21 from its side remote from the film 23 via a scanning arrangement 31 which causes the beam to scan the lens in a regular pattern, the light passing from the lens 21 to the film 23 via a point 33 which constitutes a construction point for the hologram. The resulting small cone of light 35 which impinges on the film 23 is of sufficiently large area and scans the film in a regular pattern of overlapping narrow bands such that at each point on the film is scanned the same large number of times e.g. fifty to a hundred times. As a result, each point of the film 23 is exposed during scanning to the same amount of light energy, despite variations in energy across the area of the beam 29, and a uniform and regular interference pattern is created in the film 23. The film is then processed in conventional manner to develop and fix an image of the interference pattern in the film.

The scanning arrangement 31 may be of any desired form.

Figure 3:
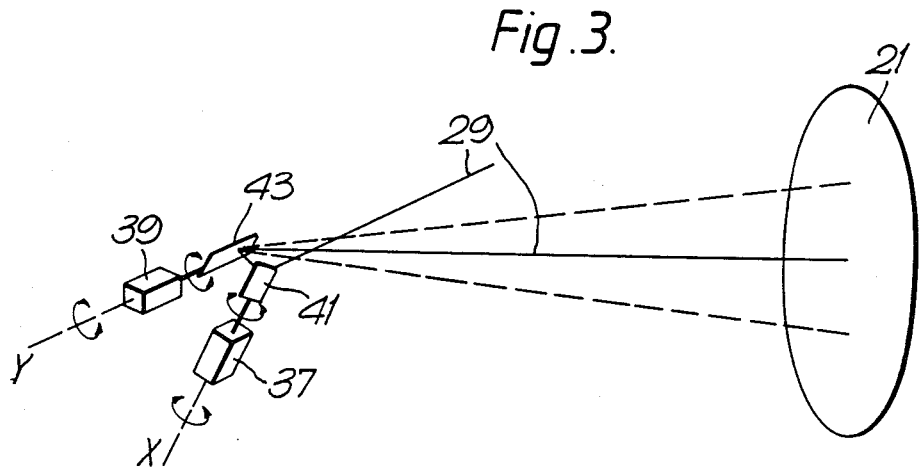
FIG. 3 is a diagram illustrating one possible form of a beam scanning arrangement used in the apparatus of FIG. 2.

Referring to FIG. 3, in one particular arrangement the scanning arrangement comprises two co-operating galvanometers 37 and 39 each of which carries a plane mirror 41 or 43, one galvanometer 37 being operated to perform a fast oscillating motion about a first axis X and the other 39 to perform a slow oscillating motion about a second axis Y, the laser beam 29 being reflected by the mirrors 41 and 43 in turn so that the lens 21, and hence the film 23, is scanned in a rectangular raster of overlapping substantially parallel straight narrow bands.

In an alternative arrangement, not illustrated, a reflector mounted on a gimbal arrangement may be employed to cause a reflected beam to scan the lens and film in a circular raster of overlapping concentric circular narrow bands or a single spiral narrow band, the turns of which overlap.

It will be noted that in the apparatus of FIG. 2 a spatial filter is not shown, and indeed will not normally be required. However, such a filter may of course be used if desired.

Figure 4:
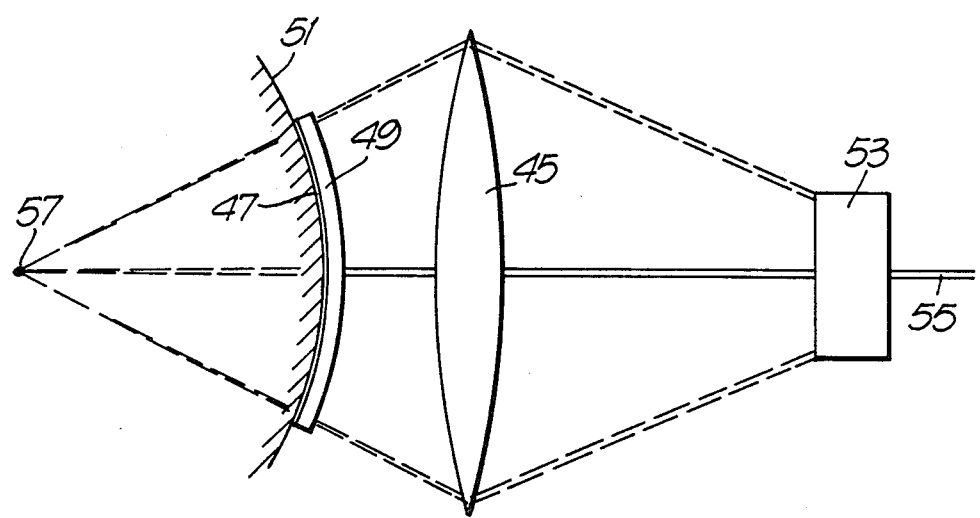
FIG. 4 is a diagram of a second apparatus.

Referring now to FIG. 4, the second apparatus comprises a lens 45, a film 47 of light sensitive material carried on a glass substrate 49, a mirror 51, and a scanning arrangement 53 arranged to direct a laser beam 55 onto the film 47 via the lens 45, as described above with reference to FIG. 2, except that the construction point 57 lies on the side of the film 47 remote from the lens 45 instead of between the film 47 and lens 45. The film 47 is typically of spherical form with its concave side towards the construction point 57, as shown in FIG. 4. In use of the apparatus the scanning arrangement 53 causes the beam 55 to scan the lens 45, and hence the film 47, as described above with reference to FIGS. 2 and 3.

I claim:

1. A method of producing a reflection hologram having substantially uniform spectral properties, comprising the steps of: forming light from a source into a beam and directing the beam onto a film of light sensitive material via a lens having an aperture of predetermined area and causing light reaching the film to pass along paths extending through a construction point; and arranging the light beam where it is incident on the lens to be of small cross-sectional area compared with the area of the aperture of the lens and scanning the light beam over the aperture of the lens so that the beam scans the film in a regular pattern of overlapping narrow bands, thereby to form said hologram in said film.

2. A method according to claim 1 wherein said regular pattern is a rectangular pattern of overlapping substantially parallel narrow bands.

3. A method according to claim 2 wherein said light beam is scanned over said aperture of the lens by means of a scanning arrangement comprising two plane reflectors on which said light beam is incident in turn, the two reflectors being arranged to perform slow and fast oscillating motions about first and second axes respectively.

4. A method according to claim 3 wherein said reflectors are oscillated by means of galvanometers.

5. A method according to claim 1 wherein said regular pattern is a circular pattern of overlapping concentric circular narrow bands.

6. A method according to claim 1 wherein said regular pattern comprises a single spiral narrow band, the turns of which overlap.

7. A method according to claim 1 wherein said hologram is formed in the film by interference between light passing from the lens through the film to a reflective surface and light reflected back through the film by the reflective surface.

8. A method according to claim 7 wherein said reflective surface is constituted by a surface of a reflector mounted adjacent said film on the side of said film remote from said lens.

9. A method according to claim 7 wherein said reflective surface is constituted by a surface of said film remote from said lens, reflection taking place at said surface by Fresnel reflection.

10. A method according to claim 7 wherein said construction point lies between said lens and said film and said reflective surface is concave.

11. A method according to claim 7 wherein said construction point lies on the side of said film remote from said lens and said reflective surface is convex.

12. An apparatus for producing a reflection hologram having substantially uniform spectral properties, comprising: a lens having an aperture of predetermined area; a light source arranged to direct onto said lens a beam of light having a cross-sectional area which is small compared with the area of the lens aperture, said lens serving to cause light leaving the lens to pass along paths extending through a construction point; and a scanning arrangement between said lens and said source arranged to scan said beam over the aperture of the lens in a regular pattern of narrow bands, thereby to cause the light beam to scan over a film of light sensitive material placed in the path of light leaving the lens in a regular pattern of overlapping narrow bands, thereby to form said hologram in said film.

13. An apparatus according to claim 12 wherein said scanning arrangement comprises two plane reflectors on which said light beam is incident in turn, the two plane reflectors being arranged to perform slow and fast oscillating motions about first and second axes respectively.

14. An apparatus according to claim 13 wherein said scanning arrangement includes first and second galvanometers for respectively causing said two plane reflectors to perform said slow and fast oscillating motions.

* * * * *